US012515469B1

(12) United States Patent
Garza et al.

(10) Patent No.: US 12,515,469 B1
(45) Date of Patent: Jan. 6, 2026

(54) APPARATUS FOR CRAFTWORK

(71) Applicant: My Sweet Petunia, Inc., Humble, TX (US)

(72) Inventors: Iliana Garza, Humble, TX (US); Richard Jones, Bridgend (GB)

(73) Assignee: My Sweet Petunia, Inc., Humble, TX (US)

( * ) Notice: Subject to any disclaimer, the term of this patent is extended or adjusted under 35 U.S.C. 154(b) by 0 days.

(21) Appl. No.: 19/319,163

(22) Filed: Sep. 4, 2025

(51) Int. Cl.
*B41K 1/36* (2006.01)
*B41K 1/40* (2006.01)
*B41K 3/02* (2006.01)

(52) U.S. Cl.
CPC . *B41K 1/40* (2013.01); *B41K 3/02* (2013.01)

(58) Field of Classification Search
CPC ........................................................ B41K 1/34
See application file for complete search history.

(56) References Cited

U.S. PATENT DOCUMENTS 228,592 A 6/1880 Barrows
2,705,454 A 4/1955 Alumbaugh
7,246,556 B1 7/2007 Stoneberg et al.
8,393,266 B2 * 3/2013 Rasmussen ............... B41F 1/04 101/287
10,518,567 B2 12/2019 Ericson et al.
10,836,193 B2 * 11/2020 Garza ................... B44B 5/0085
11,059,312 B2 * 7/2021 Ericson .................... B41K 3/32
11,518,184 B2 12/2022 Ericson et al.
11,945,246 B2 4/2024 Garza
2024/0227425 A1 7/2024 Garza

FOREIGN PATENT DOCUMENTS

GB 2503660 A * 1/2014 ............... B41K 3/04

* cited by examiner

*Primary Examiner* — Leslie J Evanisko
(74) *Attorney, Agent, or Firm* — Shane Cortesi

(57) ABSTRACT

An apparatus for craftwork is disclosed. The apparatus may comprise a base comprising a front rigid raised side portion, a rear rigid raised side portion that extends parallel to the front rigid raised side portion and a middle rigid raised side portion that is perpendicular to the front and rear rigid raised side portions so that the base is in the shape of an "I." A translucent or clear cover may be attached to the middle rigid raised side portion and the cover may be configured to pivot from a left closed position to an open position to a right closed position (and vice versa). The cover may be slightly higher in one closed position as compared to the other closed position so that one side of the cover accommodates thinner stamps and the other side of the cover accommodates thicker stamps.

30 Claims, 12 Drawing Sheets

APPARATUS FOR CRAFTWORK

TECHNICAL FIELD

The present invention relates to apparatuses for craftwork, such as stamping tools for stamping cards and other stampable substrates.

BACKGROUND OF THE INVENTION

Products for creating homemade greeting cards are known. For example, the inventor of the present application invented the MISTI stamping tool, which is distributed by My Sweet Petunia, Inc. (Humble, Texas). The MISTI stamping tool is the commercial embodiment of U.S. Pat. Nos. 9,597,909 and 9,731,531, the contents of which are incorporated herein by reference in their entirety.

However, there is a continuing need for new stamping apparatuses, especially those that are more portable and offer flexibility for different sized stampable substrates.

BRIEF SUMMARY

The present disclosure provides an apparatus for craftwork as described herein.

Without being bound by any particular theory, the apparatus may include an "I" shaped base in which a cover is attached to the stem of the "I" and a user may position an ink stamp on either side of the stem to stamp a stampable substrate located on either side of the stem. The stampable substrate may be, for example, loose paper that is placed in a recess of the base or a page of a book that is placed under the base for example.

BRIEF DESCRIPTION OF THE DRAWINGS

in FIG. 1, the cover is in the left closed position and the hinge pin has been removed for clarity.

in FIG. 2, the cover is in the right closed position.

in FIG. 3 the cover is in the left closed position.

in FIG. 4 the cover is in the left closed position.

in FIG. 8 the cover is in the left closed position.

in FIG. 9 the cover is in the left closed position.

in FIG. 10, the cover is in the right closed position.

DETAILED DESCRIPTION

Figure 1:
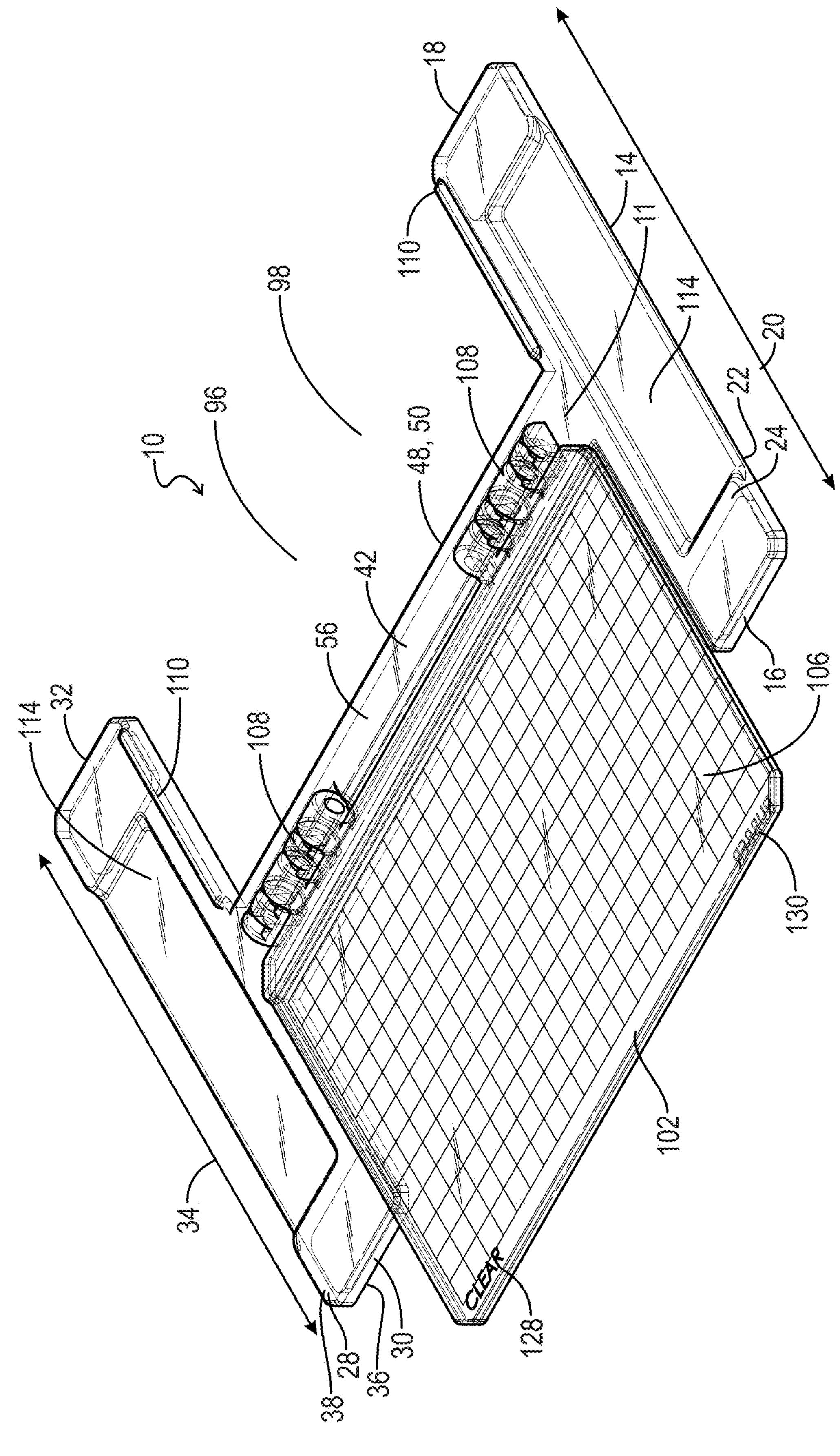
FIG. 1 illustrates a front left top perspective view of an apparatus for craftwork of one embodiment of the present invention.

With reference to FIGS. 1-23, the present invention provides an apparatus for craftwork generally designated by the numeral 10. In the drawings, not all reference numbers are included in each drawing for the sake of clarity. In addition, although the drawings are CAD drawings, drawn to scale, other dimensions are possible. It will be understood that directional terms, such as front, rear, left and right are merely for orienting the components relative to each other and the apparatus 10 may assume different orientations when in use. In addition, it will be understood that use of the singular encompasses the plural.

Referring further to FIGS. 1-23, the apparatus for craftwork 10 may be configured to stamp a stampable substrate 12. Examples of stampable substrates 12 may include, for example, paper, such as loose paper (e.g., cardstock) or pages of a book. As shown in FIGS. 1-23, the apparatus 10 may include a base 11 that may include a front rigid raised side portion 14. The front rigid raised side portion 14 may include a left side 16, a right side 18 opposite the left side 16, a length 20 extending from the left side 16 to the right side 18, a bottom 22 that may be configured to rest on a surface, a top 24 opposite the bottom 22, and/or a height 26 extending from the bottom 22 to the top 24 that may be perpendicular to the length 20. The front rigid raised side portion 14 may be in the shape of a rectangular bar for example.

The base 11 may also include a rear rigid raised side portion 28 that may be oriented parallel to (and to the rear of) the front rigid raised side portion 14. The rear rigid raised side portion 28 may comprise a left side 30, a right side 32 opposite the left side 30, a length 34 extending from the left side 30 to the right side 32 and that may be parallel to the length 34 of the front rigid raised side portion 14, a bottom 36 that may be configured to rest on a surface, a top 38 opposite the bottom 36, and/or a height 40 extending from the bottom 36 to the top 38 that may be perpendicular to the length 34 of the rear rigid raised side portion 28. The rear rigid raised side portion 28 may be in the shape of a rectangular bar for example.

The base may also include a middle rigid raised side portion 42 that may be connected to the front rigid raised side portion 14 and the rear rigid raised side portion 28 and that may extend from the front rigid raised side portion 14 to the rear rigid raised side portion 28 like a stem. The middle rigid raised side portion 42 may comprise a left side 44 that may comprise a straight edge 46 against which an edge of the stampable substrate may be positioned, a right side 48 that may be opposite the left side 44 and that may comprise a straight edge 50 against which an edge of the stampable substrate 12 may be positioned, a width 52 that may extend from the left side 44 to the right side 48 and may be perpendicular to the length 20 of the front rigid raised side portion 14, a bottom 54, a top 56 opposite the bottom 54, and/or a height 58 that may extend from the bottom 54 to the top 56 and may be perpendicular to the length of the middle rigid raised side portion 42. The middle rigid raised side portion 42 may be in the shape of a rectangular bar for example.

As shown in FIGS. 1-23 the front rigid raised side portion 14 may comprise i) a left segment 60 that may be located to the left of the middle rigid raised side portion left side 44 that may comprise a rear side 62 that may comprise a straight edge against which an edge of the stampable substrate 12 may be positioned and a front side 64 opposite the rear side 62, ii) a right segment 82 that may be located to the right of the middle rigid raised side portion right side 48 and that may comprise a rear side 84 comprising a straight edge against which an edge of the stampable substrate 12 may be positioned, and a front side 86 opposite the rear side 84, and/or iii) a middle segment 138 located between the left segment 60 and the right segment 82 and aligned with the middle rigid raised side portion 42.

The rear rigid raised side portion 28 may comprise i) a left segment 68 that may be located to the left of the middle rigid raised side portion left side 44 (and aligned with the left segment of the front rigid raised side portion 60) and that may comprise a front side 70 comprising a straight edge against which an edge of the stampable substrate 12 may be positioned and a rear side 72 opposite the front side 70, ii) a right segment 90 that may be located to the right of the middle rigid raised side portion 42 (and aligned with the right segment 82 of the front rigid raised side portion 14) and comprising a front side 92 comprising a straight edge against which an edge of the stampable substrate 12 may be positioned, and a rear side 94 opposite the front side 92, and/or iii) a middle segment 140 located between the left segment 68 and the right segment 90 and aligned with the middle rigid raised side portion 42 (and the middle segment 138 of the front rigid raised side portion 14). Preferably, all of left segment rear side 62 and right segment rear side 84 of front rigid raised side portion 14, and all of left segment front side 70 and right segment front side 92 of rear rigid raised side portion 28 comprise a straight edge.

As shown in FIGS. 1-23, the front side of the left segment 64 of the rear rigid raised side portion 28, the rear side of the left segment 62 of the front rigid raised side portion 14 and the left side of the middle rigid raised side portion 44 may form a left recess 76 that may comprise an open left side 78, and the left recess 76 may comprise a height/depth 80 parallel to the heights of the front and rear rigid raised side portions 14/28. Similarly, the front side of the right segment of the rear rigid raised side portion 92, the rear side of the right segment of the front rigid raised side portion 94 and the right side of the middle rigid raised side portion 48 may form a right recess 96 that may comprise an open right side 98, and the right recess 96 may comprise a height/depth 100 parallel to the heights of the front and rear rigid raised side portions 14/28. The left and right recesses 76/96 may be the same shape and/or size. Optionally, as shown in FIGS. 1-23, the left side of the front rigid raised side portion 16 is not connected to the left side of the rear rigid raised side portion 30 (to create the open left side of the left recess) and the right side of the front rigid raised side portion 18 is not connected to the right side of the rear rigid raised side portion 32 (to create the open right side 98 of the right recess 96).

Figure 2:
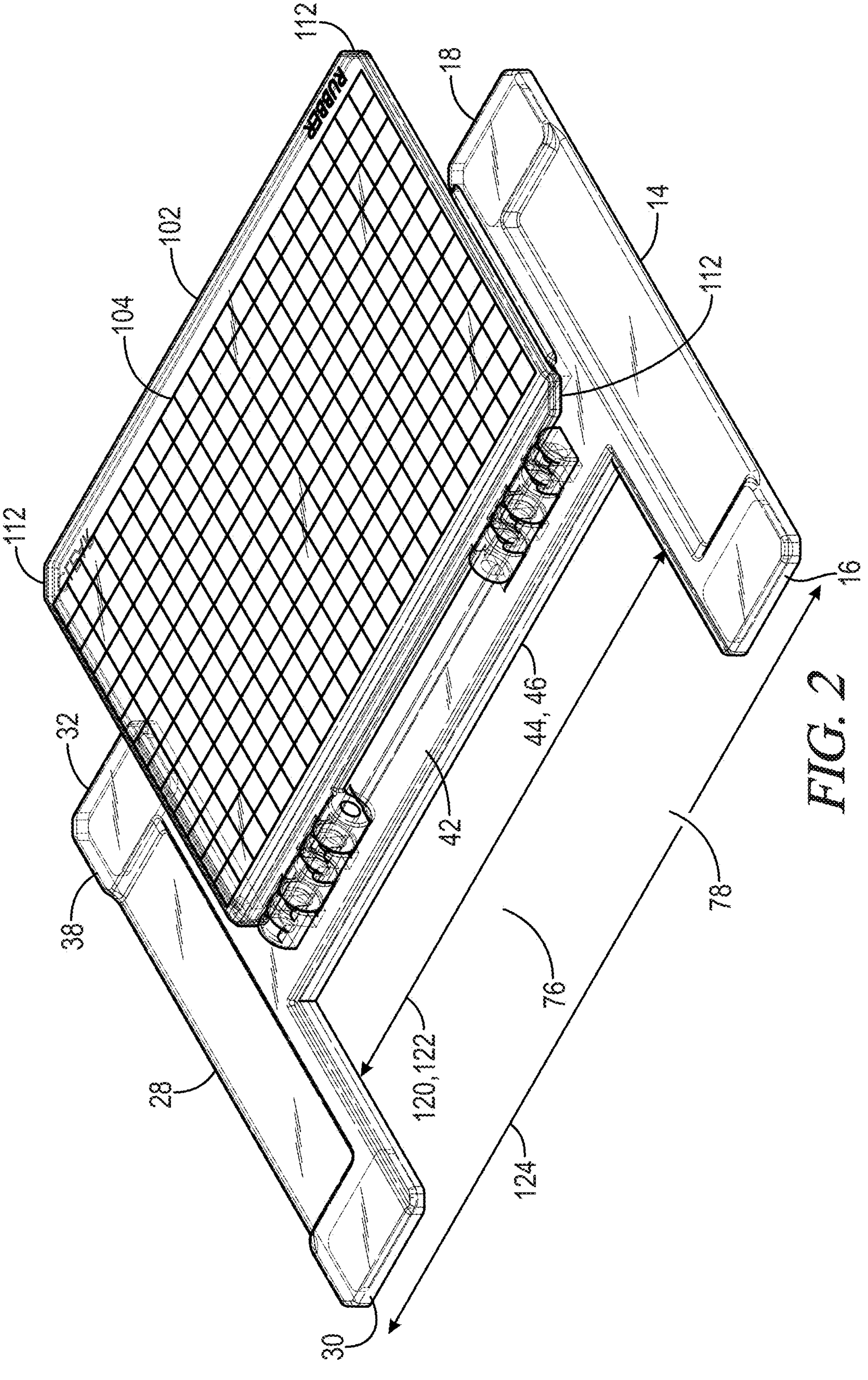
FIG. 2 illustrates a top perspective view of the apparatus of FIG. 1.
Figure 3:
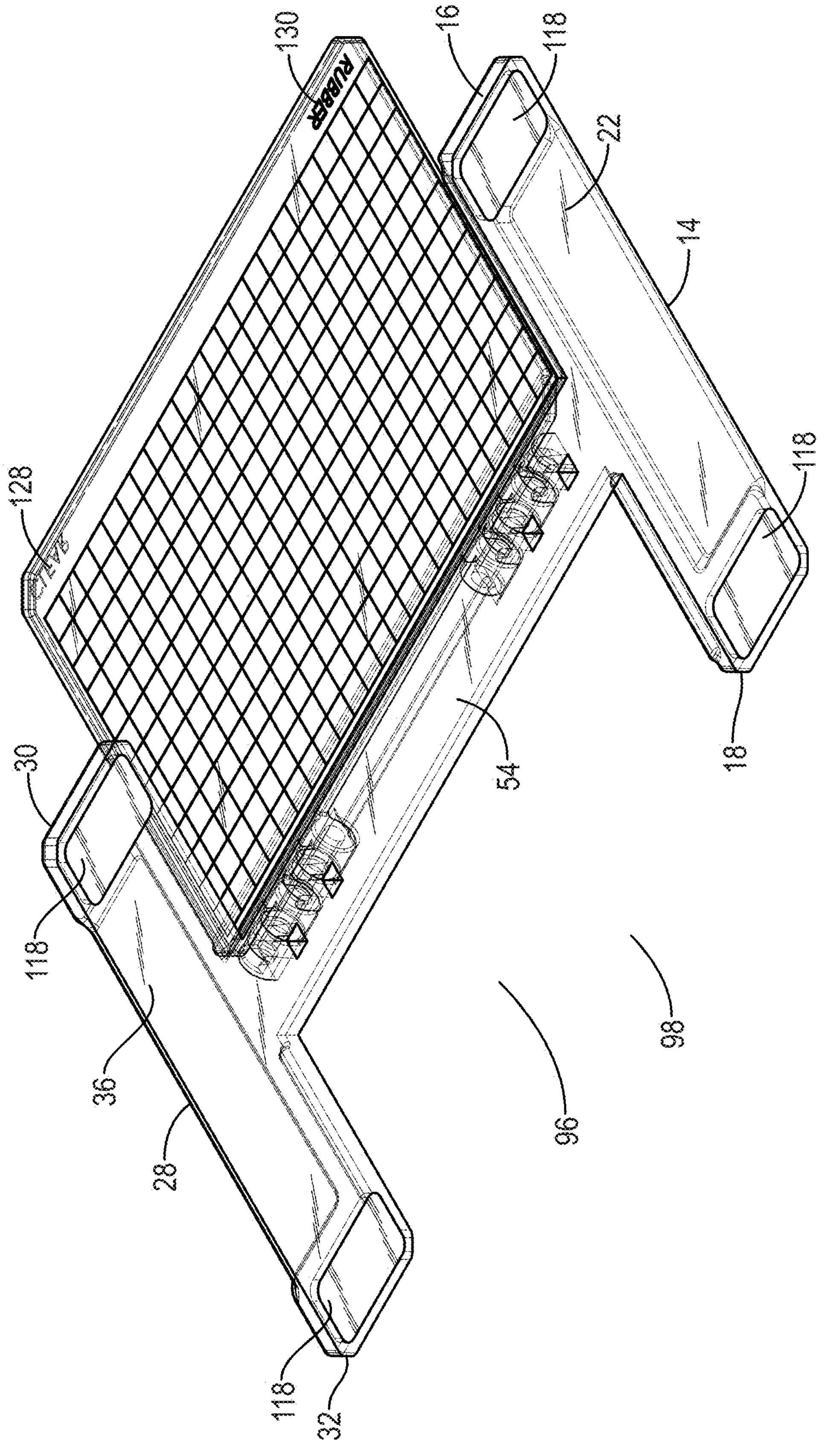
FIG. 3 illustrates a rear right bottom perspective view of the apparatus of FIG. 1.
Figure 4:
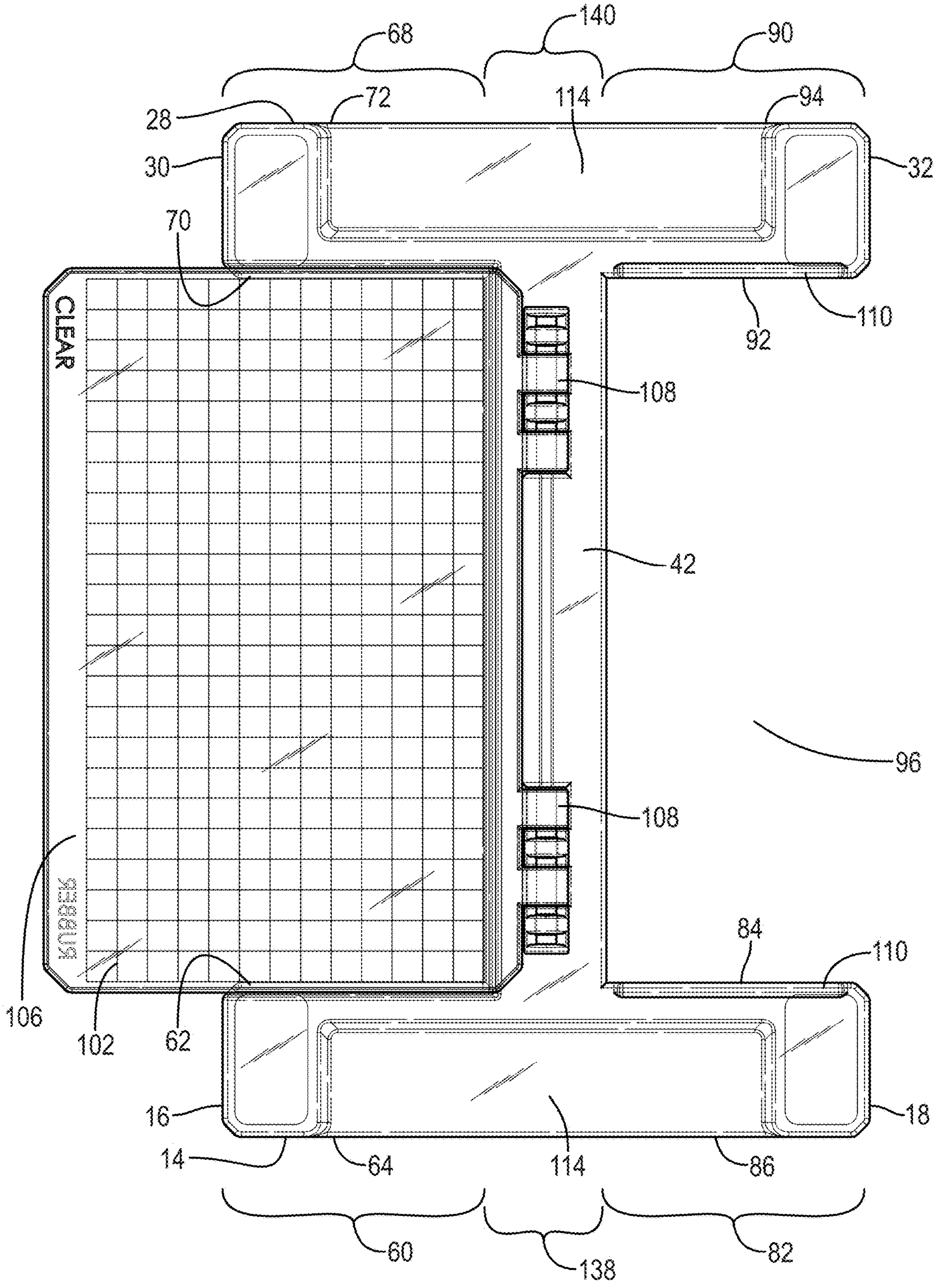
FIG. 4 illustrates a top plan view of the apparatus of FIG. 1.
Figure 5:
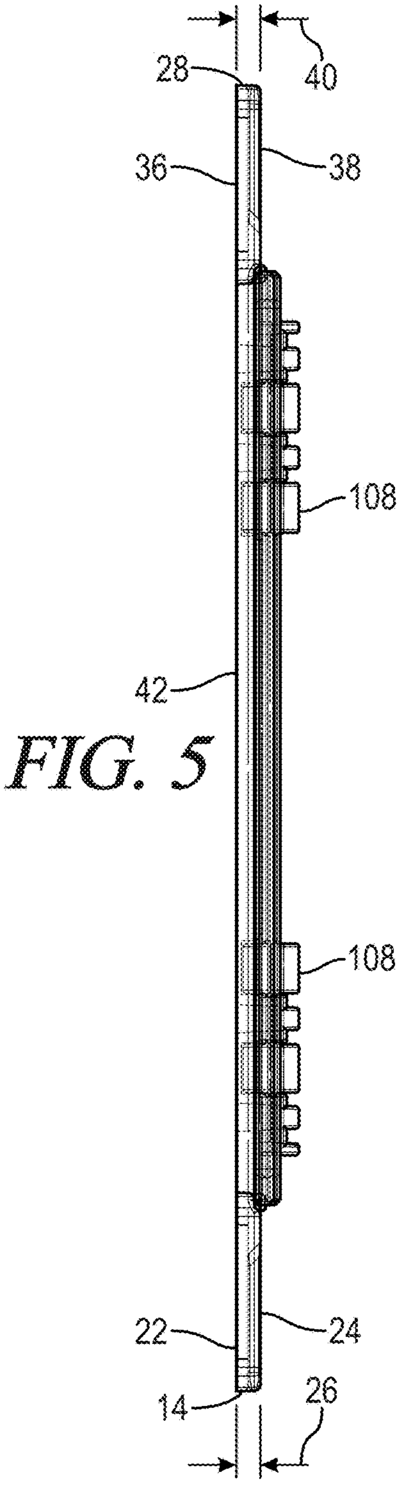
FIG. 5 illustrates a left side elevation view of the apparatus of FIG. 4.
Figure 6:
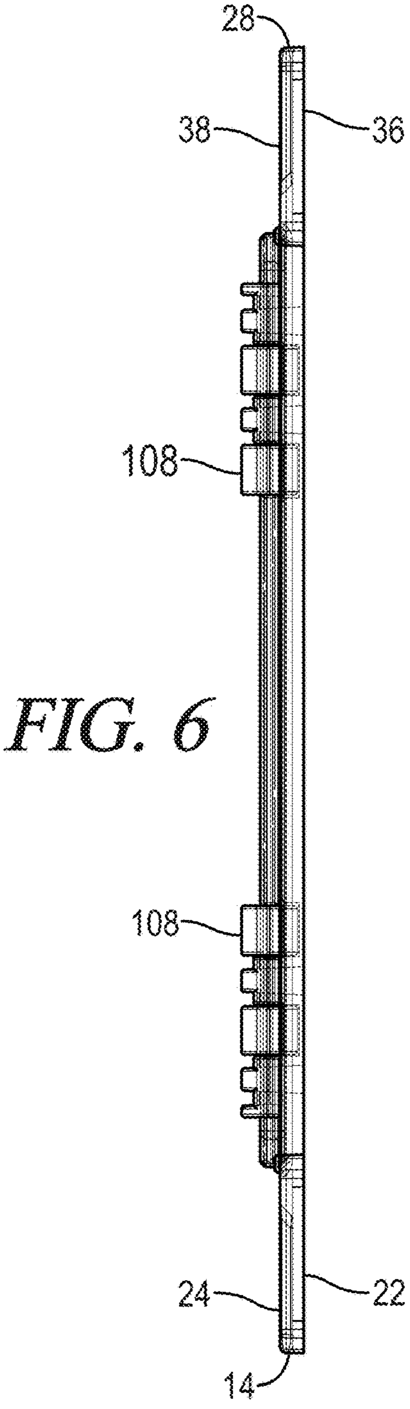
FIG. 6 illustrates a right side elevation view of the apparatus of FIG. 4.
Figure 7:
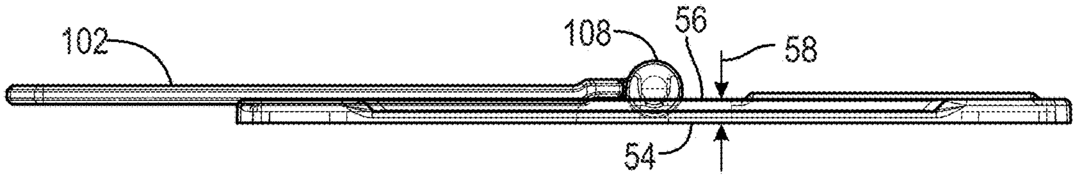
FIG. 7 illustrates a front side elevation view of the apparatus of FIG. 4.
Figure 8:
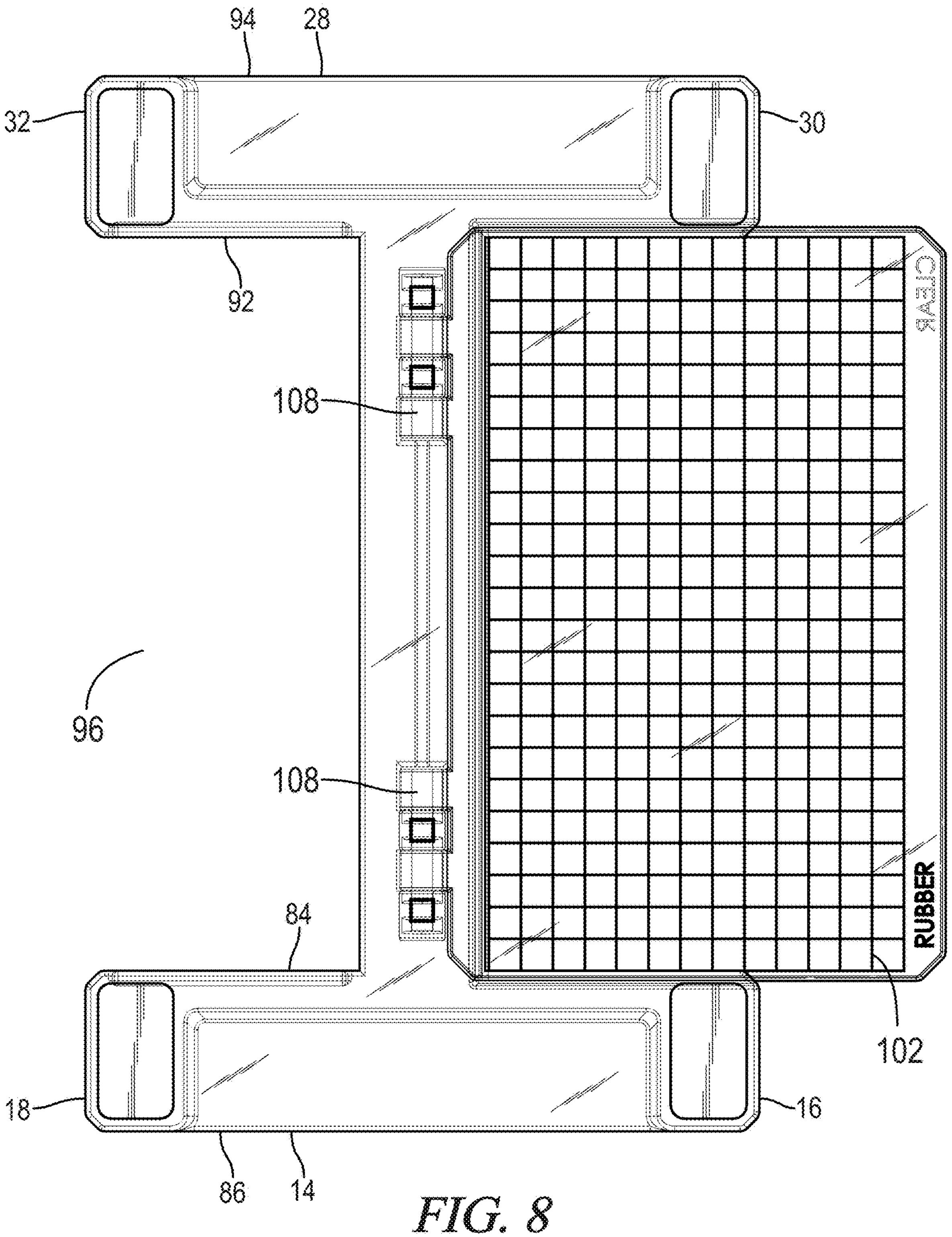
FIG. 8 illustrates a bottom plan view of the apparatus of FIG. 1.
Figure 9:
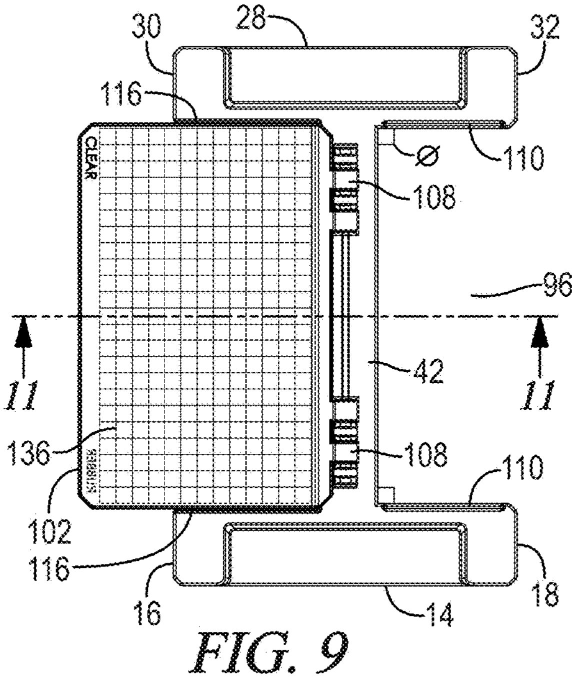
FIG. 9 illustrates another top plan view of the apparatus of FIG. 1.
Figure 10:
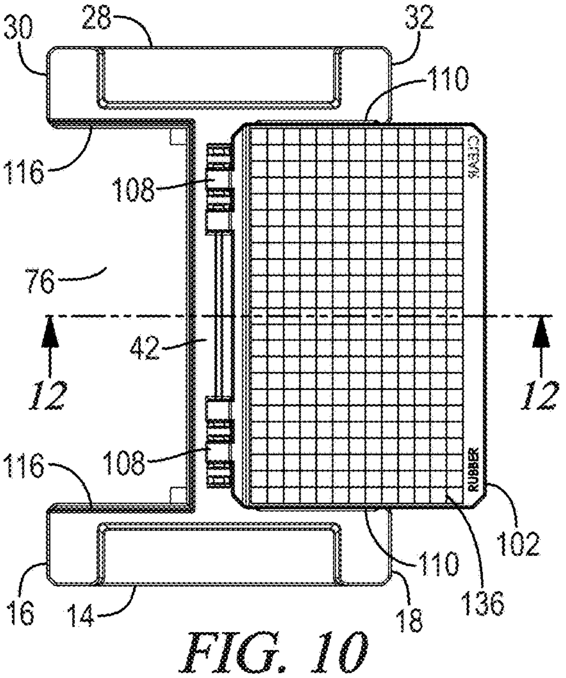
FIG. 10 illustrates another top plan view of the apparatus of FIG. 1.

As shown in FIGS. 1-23, the apparatus 10 may also include a cover/lid 102 comprising a first side 104 that may be configured to receive a clear photopolymer stamp 132 and a second side 106 configured to receive a rubber stamp 134. The cover 102 may include indicia 128/130 (such as the words CLEAR and RUBBER) to show which side of the cover 102 the stamp 132 may be positioned. For example, when the CLEAR indicia 128 is oriented correctly/face up as shown in FIG. 1, a clear photopolymer ink stamp 132 may be placed under the cover 102 (i.e., on the first side 104), and conversely, when the RUBBER indicia 130 is oriented correctly/face up as shown in FIG. 2, a rubber ink stamp 134 may be placed under the cover 102 (i.e., on the second side 106).

As shown in FIGS. 1-23, the apparatus 10 may also include at least one hinge 108 that may extend parallel to the length of the middle rigid raised side portion 120 and may pivotably connect the cover 102 to the middle rigid raised side portion 42 to allow the cover 102 to pivot about a pivot axis 150 extending parallel to the length of the middle rigid raised side portion 120. The cover 102 may be configured to pivot between a right closed position in which the cover 102 may contact the right segments 82 of the front and rear rigid raised side portions 14/28 and may be oriented perpendicular to the heights of the front and rear rigid raised side portions 14/28 and the cover second side 106 may face and may be directly above the right recess 96, an open position (not shown) in which the cover 102 may be oriented parallel to the heights of the front and rear rigid raised side portions 14/28, and a left closed position in which the cover 102 may contact the left segments of the front and rear rigid raised side portions 14/28 and may be oriented perpendicular to the heights of the front and rear rigid raised side portions 26/40 and the cover first side 104 may face and may be directly above the left recess 76.

Optionally, as shown in FIGS. 1-23, to account for the fact that rubber foam stamps 134 are thicker than clear photopolymer stamps 132, the cover 102 may be higher in the right closed position than the left closed position. For example, as detailed in FIGS. 11 and 12, the height of the right recess 96 may be greater than the height of the left recess by, for example, about 1 to about 5 millimeters (e.g., about 2 millimeters). Relatedly, the height 26 of the right segment of the front rigid raised side portion 14 and the height 26 of the right segment of the rear rigid raised side portion 28 may be greater (for example, about 1 to about 5 millimeters) than the height of the left segment of the front rigid raised side portion 60 and the height of the left segment of the rear rigid raised side portion 68. For example, in the illustrated embodiment, the right segment of the front rigid raised side portion 82 and the right segment of the rear rigid raised side portion 90 each comprise a raised lip 110 located adjacent the right recess 96, the raised lip 110 of the right segment of the front rigid raised side portion 82 and the right segment of the rear rigid raised side portion 90 are approximately the same height, and the cover 102 is configured to rest on the raised lips 110 in the right closed position. Relatedly, optionally, the left segment of the front rigid raised side portion 60 and the left segment of the rear rigid raised side portion 68 each comprise a groove 116 located adjacent the left recess 76 and optionally wherein the cover 102 is configured to rest on the grooves 116 in the left closed position.

Optionally, as shown in FIGS. 1-23, the front rigid raised side portion 14 comprises an indentation 114 located in front of the raised lip 110 of the front rigid raised side portion 14 and/or the rear rigid raised side portion 28 comprises an indentation 114 located to the rear of the raised lip 110 of the rear rigid raised side portion 28. Optionally, the indentations 114 are rectangular (e.g., to hold a rectangular bar magnet).

Optionally, as shown in FIGS. 1-23, the left and right recesses 76/96 are rectangular.

Optionally, as shown in FIGS. 1-23, the cover 102 is translucent or clear and comprises grid lines 136. Optionally, the cover 102 is rectangular in shape and comprises beveled corners 112.

Optionally, as shown in FIGS. 1-23, the rear rigid raised side portion 28, front rigid raised side portion 14 and/or middle rigid raised side portion 42 are translucent or clear.

Optionally, as shown in FIGS. 1-23, the left recess 76 comprises a length 122 perpendicular to the middle rigid raised side portion width 52 and extending from the rear side of the left segment 62 of the front rigid raised side portion 14 to the front side of the left segment 70 of the rear rigid raised side portion 28, the right recess 96 comprises a length 122 perpendicular to the middle rigid raised side portion width 52 and extending from the rear side of the right segment 94 of the front rigid raised side portion 14 to the front side of the right segment 92 of the rear rigid raised side portion 28, the cover 102 comprises a front side 104, a rear side 106 opposite the front side 104 and a length extending from the front side 104 to the rear side 106 and perpendicular to the middle rigid raised side portion width 52, and the length of the cover 102 is greater than the lengths of the left and the right recesses 122, which allows the cover 102 to rest on the front and rear rigid raised side portions 14/28 in the right and left closed positions. Relatedly, the cover 102 may extend to the right of the right ends of the front and rear rigid raised side portions 14/28 in the right closed position, and/or the cover 102 may extend to the left of the left ends of the front and rear rigid raised side portions 14/28 in the left closed position.

Optionally, as shown in FIGS. 1-23, the bottoms 22/36 of the front and rear rigid raised side portions 14/28 comprise a foam pad 118.

Optionally, as shown in FIGS. 1-23, the at least one hinge 108 is located on the top of the middle rigid raised side portion 42. Optionally, the pivot axis 150 is located above the top of the front, middle and rear rigid raised side portions 14/28/42.

Optionally, as shown in FIGS. 1-23, the apparatus 10 comprises an apparatus length 124 extending from the front sides of the left and right segments 64/86 of the front rigid raised side portion 14 to the rear sides of the left and right segments 72/94 of the rear rigid raised side portion 28 so that the front rigid raised side portion 14 is the front of the apparatus 10 and the rear rigid raised side portion 28 is the rear of the apparatus 10.

Optionally, as shown in FIGS. 1-23, the front rigid raised side portion, rear rigid raised side portion and middle rigid raised side portion 14/28/42 form an I.

Optionally, as shown in FIGS. 1-23, the front rigid raised side portion, rear rigid raised side portion, and middle rigid raised side portion 14/28/42 are integral (e.g., comprised of a single piece of plastic or acrylic). Alternatively, the front rigid raised side portion, rear rigid raised side portion, and middle rigid raised side portion 14/28/42 may be discrete pieces that are attached.

Optionally, the front and rear rigid raised side portions 14/28 are longer than they are wide—e.g., the distance from the front to the rear sides of the left and right segments of the front and rear rigid raised side portions is less than the length 20/34 of the front and rear rigid raised side portions 14/28.

Optionally, an ink stamp 134 is removably attached to the first 104 or second side 106 of the cover 102.

Figure 11:
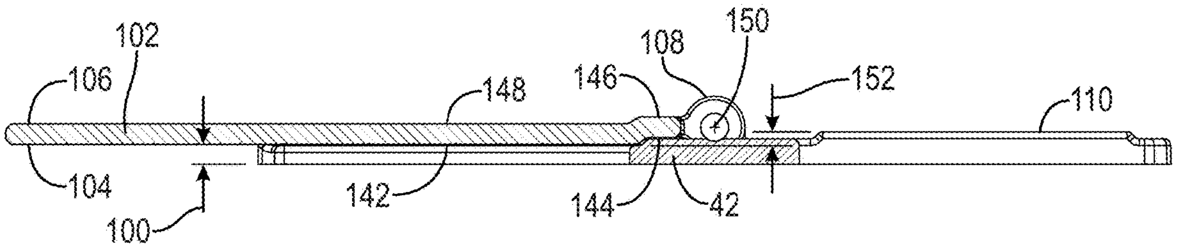
FIG. 11 illustrates a sectional view of the apparatus of FIG. 9 taken along line 11-11 of FIG. 9.
Figure 12:
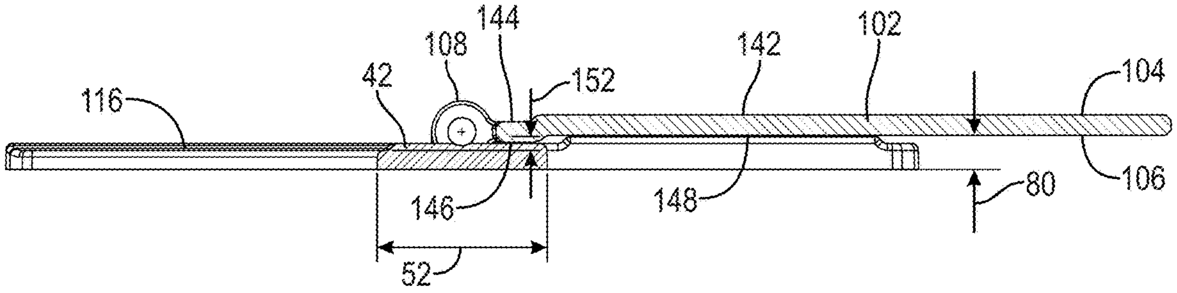
FIG. 12 illustrates a sectional view of the apparatus of FIG. 10 taken along line 12-12 of FIG. 10.
Figure 13:
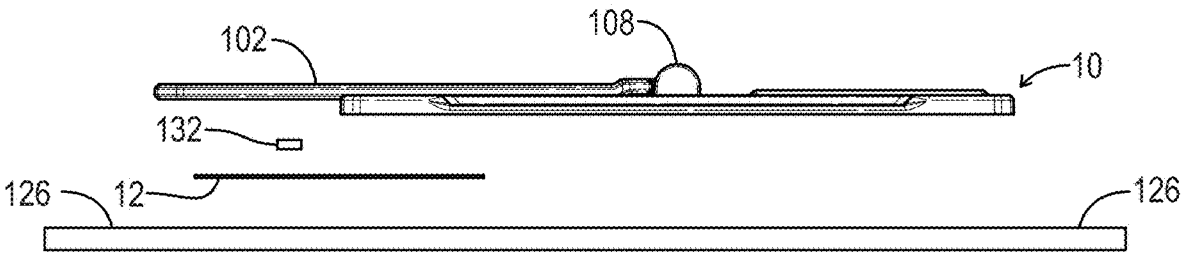
FIG. 13 is an exploded view showing how the apparatus of FIG. 1 may be used with an ink stamp, stampable substrate and a platform.
Figure 14:
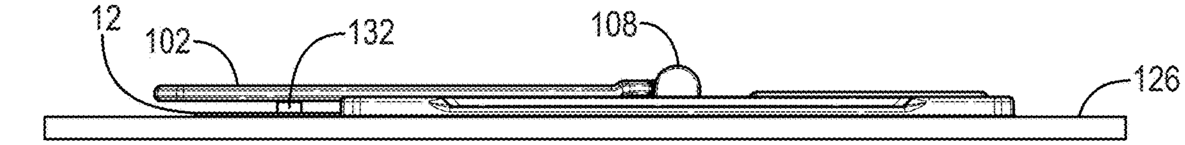
FIG. 14 is a perspective view showing the apparatus, ink stamp, stampable substrate and platform of FIG. 13.
Figure 15:
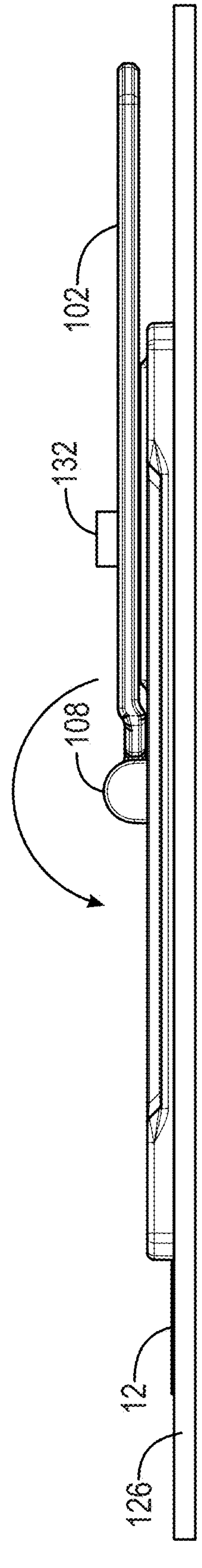
FIG. 15 is a perspective view showing the apparatus of FIG. 1, a clear photopolymer ink stamp, a stampable substrate and a platform, with the apparatus in the right closed position.
Figure 16:
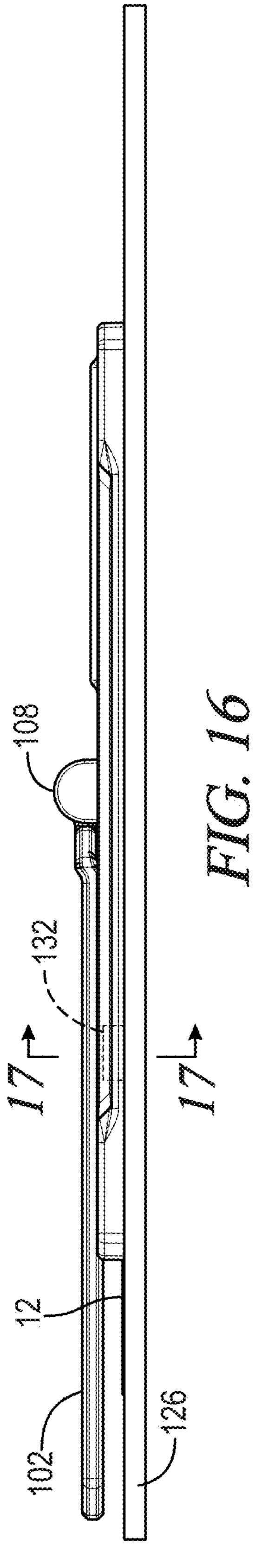
FIG. 16 is a perspective view showing the apparatus, clear photopolymer ink stamp, stampable substrate and platform of FIG. 15, with the apparatus in the left closed position.
Figure 17:
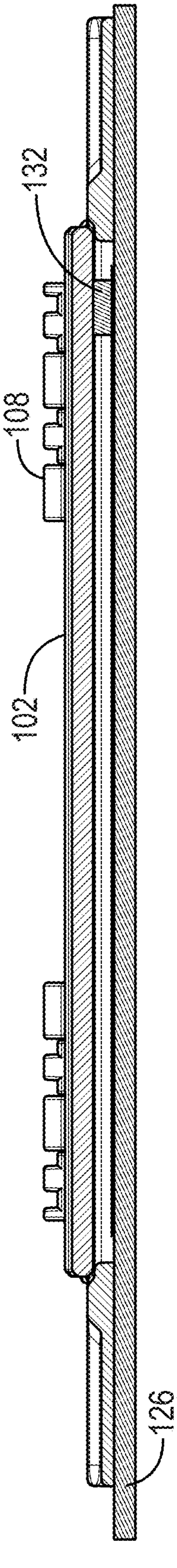
FIG. 17 illustrates a sectional view of the apparatus, clear photopolymer ink stamp, stampable substrate and platform of FIG. 16, taken along line 17-17 of FIG. 16.
Figure 18:
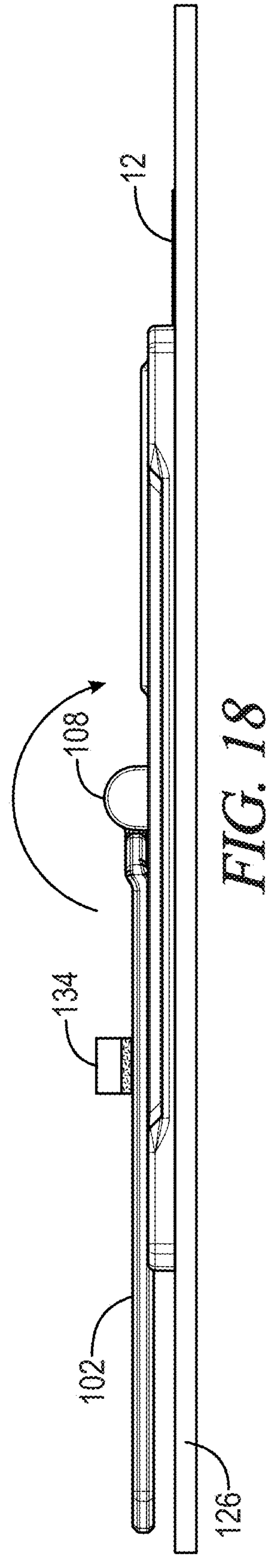
FIG. 18 is a perspective view showing the apparatus of FIG. 1, a foam rubber ink stamp, a stampable substrate and a platform, with the apparatus in the left closed position.
Figure 19:
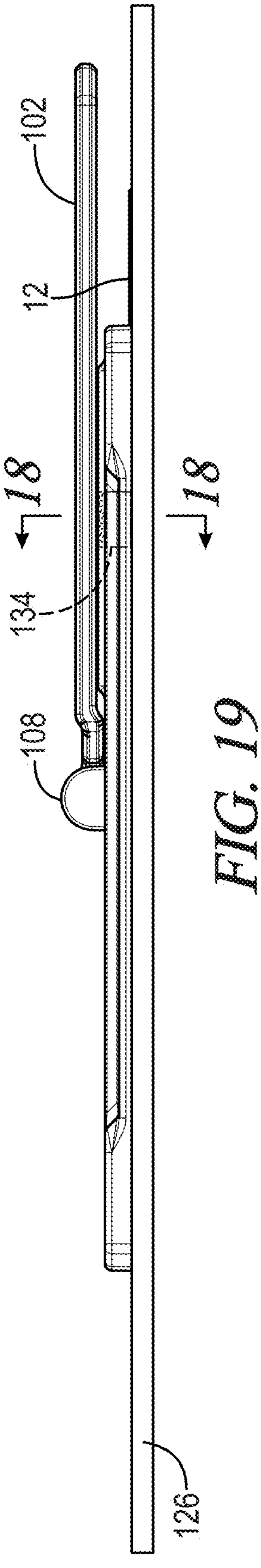
FIG. 19 is a perspective view showing the apparatus, foam rubber ink stamp, stampable substrate and platform of FIG. 18, with the apparatus in the right closed position.
Figure 20:
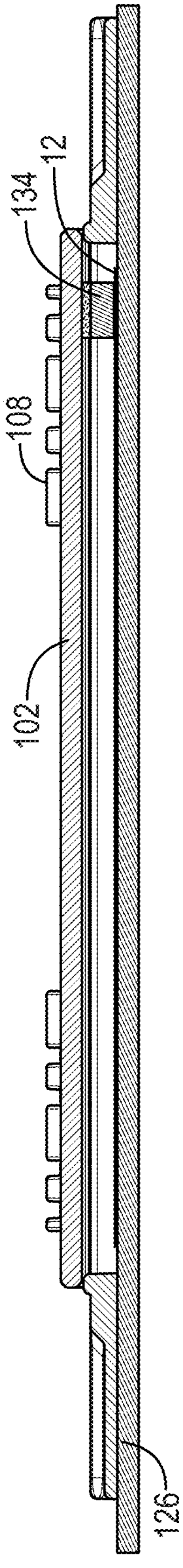
FIG. 20 illustrates a sectional view of the apparatus, foam rubber ink stamp, stampable substrate and platform of FIG. 19, taken along line 18-18 of FIG. 19.
Figure 21:
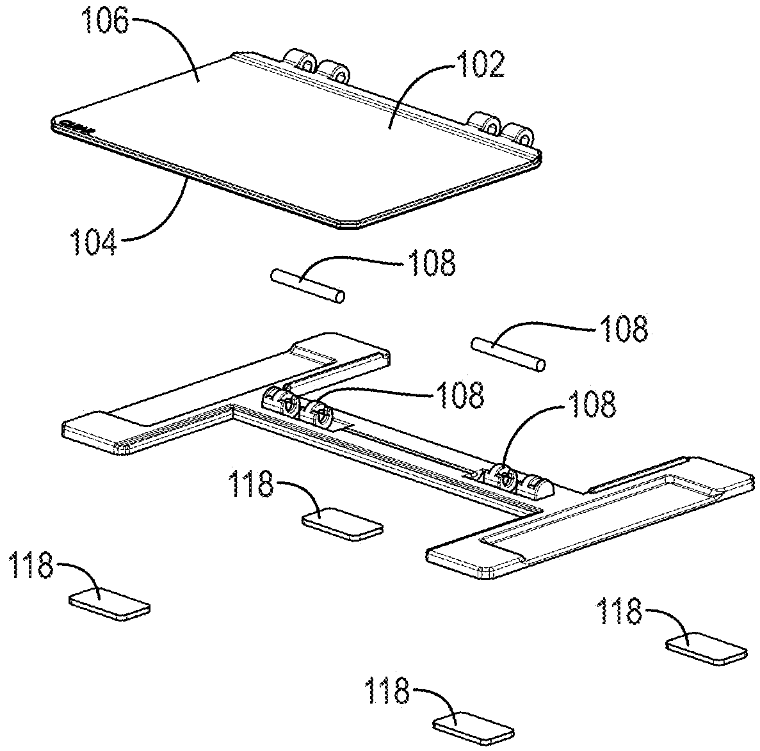
FIG. 21 is a front left top perspective, exploded view of the apparatus for craftwork of FIG. 1 with the hinge pin added.
Figure 22:
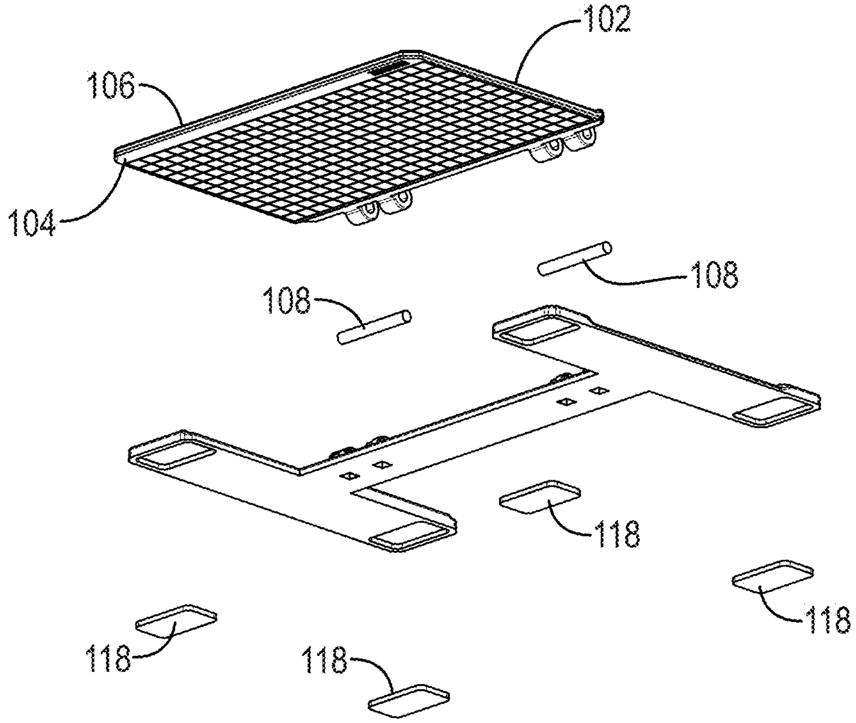
FIG. 22 is a front left bottom perspective, exploded view of the apparatus for craftwork of FIG. 21.

Optionally, as shown in FIGS. 1-23, the first side 104 and the second side 106 of the cover 102 comprise a substantially flat surface. For example, as best seen in FIGS. 11 and 12, the cover 102 is mostly flat with a slight "S" shape or step to allow the hinge 108 to close. In other words, the first and second sides 104/106 of the cover 102 may be mostly (but not entirely) flat. More particularly, when the cover 102 is in the right closed position, the cover second side 106 may comprise a protrusion/lower portion 146 contacting the middle rigid raised side portion 42 and a raised/slightly elevated portion 148 located to the right of the protrusion 146 and contacting the raised lip 110. And when the cover 102 is in the left closed position, the cover first side 104 may comprise a raised/slightly elevated portion 144 contacting the middle rigid raised side portion 42 and a lower portion 142 located to the left of the raised portion 144 and contacting the grooves 116. The difference in height between the raised and lower portions 144/142 and 148/146 may be for example about 0.1 to 5 millimeters (e.g., about 0.5 to 2 millimeters).

Optionally, as shown in FIGS. 1-23, the rear of the right segment 92 of the front rigid raised side portion 14 and the right side of the middle rigid raised side portion 48 form a corner having an angle θ of approximately 90 degrees, the rear of the left segment of the front rigid raised side portion 62 and the left side of the middle rigid raised side portion 44 form a corner having an angle θ of approximately 90 degrees, the front of the right segment of the rear rigid raised side portion 92 and the right side of the middle rigid raised side portion 48 form a corner having an angle θ of approximately 90 degrees, and the front of the left segment of the rear rigid raised side portion 70 and the left side of the middle rigid raised side portion 44 form a corner having an angle θ of approximately 90 degrees to allow a card or other stampable substrate to be placed against a corner if desired.

Optionally, as shown in FIGS. 1-23, the left recess 76 and the right recess 96 each comprise an open top and an open bottom.

Optionally, the front, rear and middle rigid raised side portions 14/28/42 are rigid.

Optionally, in the open position (not shown), the apparatus 10 comprises a bottom located at the bottoms of the front and rear rigid raised side portions 14/28, a top located at edge of the cover 102 opposite the middle rigid raised side portion 42 and a height extending from the bottom of the apparatus to the top of the apparatus and parallel to the front and rear rigid raised side portion 14/28 heights.

Optionally, the bottom of the middle rigid raised side portion is also configured to rest on the platform surface 126 (i.e., the bottoms of the front, middle and rear rigid raised side portions are the same height).

Optionally, as shown in FIGS. 1-23, the middle rigid raised side portion 42 is centered with respect to the front and rear rigid raised side portions 14/28—i.e., the middle rigid raised side portion 42 is located in the lengthwise center of the front rigid raised side portion 14 and the lengthwise center of the rear rigid raised side portion 28.

Optionally, as shown in FIGS. 1-23, the middle rigid raised side portion 42, the front rigid raised side portion 14 and/or the rear rigid raised side portion 28 are rectangular.

Optionally, as shown in FIGS. 1-23, the middle segments 138/140 of the front rigid raised side portion 14 and rear rigid raised side portion 28 comprise a middle segment length 120 that is equal to the middle rigid raised side portion 42 width.

Optionally, as shown in FIGS. 1-23, the apparatus 10 is substantially symmetrical about middle rigid raised side portion 42.

The apparatus 10 may be used in any suitable method. For example, the apparatus 10 may be used in a method that comprises: a) providing the apparatus 10; b) placing the stampable substrate 12 in the left or right recess 76/96; c) placing an ink stamp 134 on the first or second side 104/106 of the cover 102; and/or d) moving the cover 102 from the left closed position to the right closed position or from the right closed position to the left closed position to stamp the stampable substrate 12 with the ink stamp 134. In some cases, an edge of the stampable substrate 12 may be placed against a straight edge 46/50 of the left or right side of the middle rigid raised side portion 42 and another edge of the stampable substrate 12 may be placed against a straight edge of the left or right segments of the rear side of the front rigid raised side portion 62 or 84 or a straight edge of the left or right segments of the front side of the rear rigid raised side portion 72 or 92.

As shown in FIGS. 15-20, the method may utilize placing the stampable substrate 12 and the apparatus 10 on a platform 126. For example, in some cases, the platform 126 may be metallic and the method may also involve placing a magnet over the stampable substrate 12 before step d) to secure the stampable substrate 12 prior to stamping.

Figure 23:
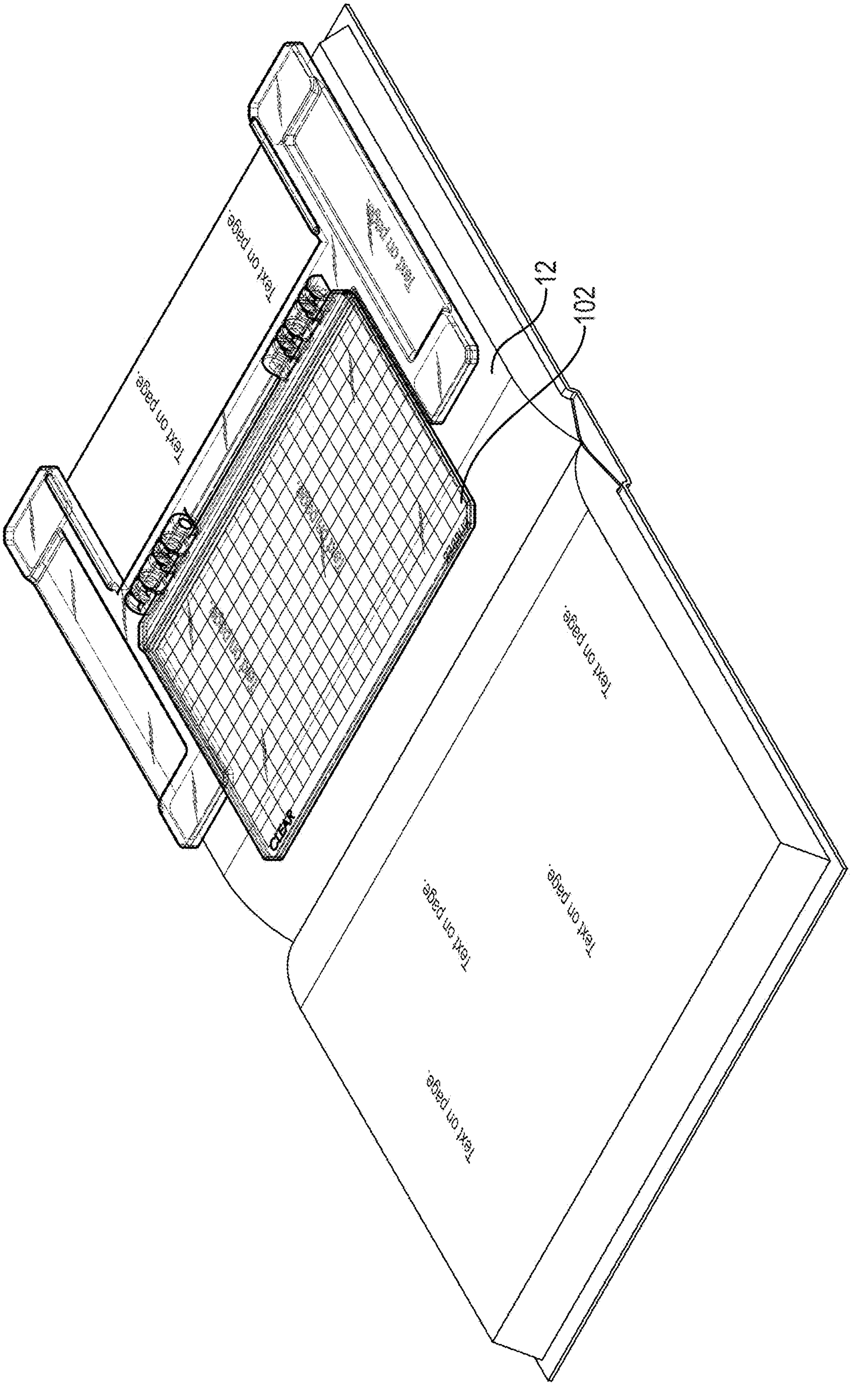
FIG. 23 is a front left top perspective view of the apparatus for craftwork of FIG. 1 stamping a book.

Alternatively, as shown in FIG. 23, the apparatus 10 may be placed directly on top of a book. In such embodiments, the method may include: a) providing the apparatus 10; b) placing the apparatus 10 on top of the stampable substrate 12; c) placing an ink stamp 134 on the first or second side 104/106 of the cover 102; and/or d) moving the cover 102 from the left closed position to the right closed position or from the right closed position to the left closed position to stamp the stampable substrate 12 with the ink stamp 134.

| PARTS LIST | |
|---|---|
| Craftwork apparatus | 10 |
| Base | 11 |
| Stampable substrate | 12 |
| Front rigid raised side portion | 14 |
| Front rigid raised side portion left side | 16 |
| Front rigid raised side portion right side | 18 |
| Front rigid raised side portion length | 20 |
| Front rigid raised side portion bottom | 22 |
| Front rigid raised side portion top | 24 |
| Front rigid raised side portion height | 26 |
| Rear rigid raised side portion/arm/base bar | 28 |
| Rear rigid raised side portion left side | 30 |
| Rear rigid raised side portion right side | 32 |
| Rear rigid raised side portion length | 34 |
| Rear rigid raised side portion bottom | 36 |
| Rear rigid raised side portion top | 38 |
| Rear rigid raised side portion height | 40 |
| Middle rigid raised side portion | 42 |
| Middle rigid raised side portion left side | 44 |

-continued

| PARTS LIST | |
|---|---|
| Middle rigid raised side portion left side straight edge | 46 |
| Middle rigid raised side portion right side | 48 |
| Middle rigid raised side portion right side straight edge | 50 |
| Middle rigid raised side portion width | 52 |
| Middle rigid raised side portion bottom | 54 |
| Middle rigid raised side portion top | 56 |
| Middle rigid raised side portion height | 58 |
| Front rigid raised side portion left segment | 60 |
| Front rigid raised side portion left segment rear side | 62 |
| Front rigid raised side portion left segment front side | 64 |
| Rear rigid raised side portion left segment | 68 |
| Rear rigid raised side portion left segment front side | 70 |
| Rear rigid raised side portion left segment rear side | 72 |
| Left recess | 76 |
| Left recess open left side | 78 |
| Left recess height/depth | 80 |
| Front rigid raised side portion right segment | 82 |
| Front rigid raised side portion right segment rear side | 84 |
| Front rigid raised side portion right segment front side | 86 |
| Rear rigid raised side portion right segment | 90 |
| Rear rigid raised side portion right segment front side | 92 |
| Rear rigid raised side portion right segment rear side | 94 |
| Right recess | 96 |
| Right recess open right side | 98 |
| Right recess height/depth | 100 |
| Cover | 102 |
| Cover first side | 104 |
| Cover second side | 106 |
| Hinge | 108 |
| Raised lip | 110 |
| Cover beveled edge | 112 |
| Indentation for magnet | 114 |
| Groove | 116 |
| Foam pad | 118 |
| Middle rigid raised side portion length | 120 |
| Recess length | 122 |
| Apparatus length | 124 |
| Platform | 126 |
| Cover first indicia | 128 |
| Cover second indicia | 130 |
| Clear photopolymer ink stamp | 132 |
| Foam rubber ink stamp | 134 |
| Cover gridlines | 136 |
| Front rigid raised side portion middle segment | 138 |
| Rear rigid raised side portion middle segment | 140 |
| Cover first side lower portion | 142 |
| Cover first side raised portion | 144 |
| Cover second side protrusion | 146 |
| Cover second side raised portion | 148 |
| Pivot axis | 150 |
| Height difference between contact points | 152 |
| Angle | $\theta$ |

Having now described the invention in accordance with the requirements of the patent statutes, those skilled in the art will understand how to make changes and modifications to the disclosed embodiments to meet their specific requirements or conditions. Changes and modifications may be made without departing from the scope and spirit of the invention. In addition, the steps of any method described herein may be performed in any suitable order and steps may be performed simultaneously if needed.

Terms of degree such as “generally”, “substantially”, “about” and “approximately” as used herein mean a reasonable amount of deviation of the modified term such that the end result is not significantly changed. For example, these terms can be construed as including a deviation of at least ±5% of the modified term if this deviation would not negate the meaning of the word it modifies.

What is claimed is:

1. An apparatus for craftwork configured to stamp a stampable substrate, the apparatus comprising:

a base comprising:

a front rigid raised side portion comprising a left side, a right side opposite the left side, a length extending from the left side to the right side, a bottom configured to rest on a surface, a top opposite the bottom, and a height extending from the bottom to the top and perpendicular to the length;

a rear rigid raised side portion comprising a left side, a right side opposite the left side, a length extending from the left side to the right side and parallel to the length of the front rigid raised side portion, a bottom configured to rest on the surface, a top opposite the bottom, and a height extending from the bottom to the top and perpendicular to the length of the rear rigid raised side portion;

a middle rigid raised side portion connected to the front rigid raised side portion and the rear rigid raised side portion, extending from the front rigid raised side portion to the rear rigid raised side portion and comprising a left side comprising a straight edge against which an edge of the stampable substrate may be positioned, a right side opposite the left side and comprising a straight edge against which an edge of the stampable substrate may be positioned, a width extending from the left side to the right side and perpendicular to the length of the front rigid raised side portion, a length perpendicular to the width of the middle rigid raised side portion, a bottom, a top opposite the bottom, and a height extending from the bottom to the top and perpendicular to the length of the middle rigid raised side portion, wherein the front rigid raised side portion comprises i) a left segment located to the left of the middle rigid raised side portion left side and comprising a rear side comprising a straight edge against which an edge of the stampable substrate may be positioned and a front side opposite the rear side, ii) a right segment located to the right of the middle rigid raised side portion right side and comprising a rear side comprising a straight edge against which an edge of the stampable substrate may be positioned, and a front side opposite the rear side, and iii) a middle segment located between the left segment and the right segment;

wherein the rear rigid raised side portion comprises i) a left segment located to the left of the middle rigid raised side portion left side and comprising a front side comprising a straight edge against which an edge of the stampable substrate may be positioned and a rear side opposite the front side, ii) a right segment located to the right of the middle rigid raised side portion right side and comprising a front side comprising a straight edge against which an edge of the stampable substrate may be positioned, and a rear side opposite the front side, and iii) a middle segment located between the left segment and the right segment;

wherein the front side of the left segment of the rear rigid raised side portion, the rear side of the left segment of the front rigid raised side portion and the left side of the middle rigid raised side portion form a left recess comprising an open left side, the left recess comprising a height parallel to the heights of the front and rear rigid raised side portions, wherein the front side of the right segment of the rear rigid raised side portion, the rear side of the right segment of the front rigid raised side portion and the right side of the middle rigid raised side portion form a right recess comprising an open right side, the right recess comprising a height parallel to the heights of the front and rear rigid raised side portions;

a cover comprising a first side configured to receive a photopolymer ink stamp and a second side configured to receive a rubber ink stamp; and at least one hinge extending parallel to the length of the middle rigid raised side portion and pivotably connecting the cover to the middle rigid raised side portion to allow the cover to pivot about a pivot axis extending parallel to the length of the middle rigid raised side portion, wherein the cover is configured to pivot between a right closed position in which the cover contacts the right segments of the front and rear rigid raised side portions and is oriented perpendicular to the heights of the front and rear rigid raised side portions and the cover second side faces and is directly above the right recess, an open position in which the cover is oriented parallel to the heights of the front and rear rigid raised side portions, and a left closed position in which the cover contacts the left segments of the front and rear rigid raised side portions and is oriented perpendicular to the heights of the front and rear rigid raised side portions and the cover first side faces and is directly above the left recess, and further wherein the cover is lower in the left closed position than the right closed position.

2. The apparatus of claim 1 wherein the height of the right recess is greater than the height of the left recess by about 1 to about 5 millimeters.

3. The apparatus of claim 1 wherein the height of the right segment of the front rigid raised side portion and the height of the right segment of the rear rigid raised side portion are greater than the height of the left segment of the front rigid raised side portion and the height of the left segment of the rear rigid raised side portion.

4. The apparatus of claim 1 wherein the right segment of the front rigid raised side portion and the right segment of the rear rigid raised side portion each comprise a raised lip located adjacent the right recess and further wherein the raised lip of the right segment of the front rigid raised side portion and the right segment of the rear rigid raised side portion are approximately the same height, and further wherein the cover is configured to rest on the raised lips in the right closed position.

5. The apparatus of claim 1 wherein the front rigid raised side portion comprises an indentation located in front of the raised lip of the front rigid raised side portion and further wherein the rear rigid raised side portion comprises an indentation located to the rear of the raised lip of the rear rigid raised side portion.

6. The apparatus of claim 5 wherein the indentations are rectangular.

7. The apparatus of claim 1 wherein the left segment of the front rigid raised side portion and the left segment of the rear rigid raised side portion each comprise a groove located adjacent the left recess and further wherein the cover is configured to rest on the groves in the left closed position.

8. The apparatus of claim 1 wherein the left and right recesses are rectangular.

9. The apparatus of claim 1 wherein the cover is translucent or clear and comprises grid lines.

10. The apparatus of claim 1 wherein the rear rigid raised side portion, front rigid raised side portion and/or middle rigid raised side portion are translucent or clear.

11. The apparatus of claim 1 wherein the cover is rectangular in shape and comprises beveled corners.

12. The apparatus of claim 1 wherein the left recess comprises a length perpendicular to the middle rigid raised side portion width and extending from the rear side of the left segment of the front rigid raised side portion to the front side of the left segment of the rear rigid raised side portion, wherein the right recess comprises a length perpendicular to the middle rigid raised side portion width and extending from the rear side of the right segment of the front rigid raised side portion to the front side of the right segment of the rear rigid raised side portion, wherein the cover comprises a front side, a rear side opposite the front side and a length extending from the front side to the rear side and perpendicular to the middle rigid raised side portion width, and further wherein the length of the cover is greater than the lengths of the left and the right recesses.

13. The apparatus of claim 1 wherein the at least one hinge is located on the top of the middle rigid raised side portion.

14. The apparatus of claim 13 wherein the pivot axis is located above the top of the front, middle and rear rigid raised side portions.

15. The apparatus of claim 1 wherein the first side and second side of the cover are stepped.

16. The apparatus of claim 1 wherein the front rigid raised side portion, rear rigid raised side portion and middle rigid raised side portion form an I.

17. The apparatus of claim 1 wherein the front rigid raised side portion, rear rigid raised side portion, and middle rigid raised side portion are integral.

18. The apparatus of claim 1 wherein the distance from the front to the rear sides of the left and right segments of the front and rear rigid raised side portions is less than the length of the front and rear rigid raised side portions.

19. The apparatus of claim 1 wherein the cover extends to the right of the right ends of the front and rear rigid raised side portions in the right closed position, and the cover extends to the left of the left ends of the front and rear rigid raised side portions in the left closed position.

20. The apparatus of claim 1 wherein an ink stamp is removably attached to the first or second side of the cover.

21. The apparatus of claim 1 wherein the rear of the right segment of the front rigid raised side portion and the right side of the middle rigid raised side portion form a corner having an angle of approximately 90 degrees, wherein the rear of the left segment of the front rigid raised side portion and the left side of the middle rigid raised side portion form a corner having an angle of approximately 90 degrees, wherein the front of the right segment of the rear rigid raised side portion and the right side of the middle rigid raised side portion form a corner having an angle of approximately 90 degrees, and wherein the front of the left segment of the rear rigid raised side portion and the left side of the middle rigid raised side portion form a corner having an angle of approximately 90 degrees.

22. The apparatus of claim 1 wherein the left recess and the right recess each comprise an open top and an open bottom.

23. The apparatus of claim 1 wherein the left side of the front rigid raised side portion is not connected to the left side of the rear rigid raised side portion and further wherein the right side of the front rigid raised side portion is not connected to the right side of the rear rigid raised side portion.

24. The apparatus of claim 1 wherein the front, rear and middle rigid raised side portions are rigid.

25. The apparatus of claim 1 wherein, in the open position, the apparatus comprises a bottom located at the bottoms of the front and rear rigid raised side portions, a top located at edge of the cover opposite the middle rigid raised side portion and a height extending from the bottom of the apparatus to the top of the apparatus and parallel to the front and rear rigid raised side portion heights.

26. The apparatus of claim 1 wherein the bottom of the middle rigid raised side portion is configured to rest on a surface.

27. The apparatus of claim 1 wherein the middle rigid raised side portion is located in/centered with respect to the lengthwise center of the front rigid raised side portion and the lengthwise center of the rear rigid raised side portion.

28. The apparatus of claim 1 wherein the middle rigid raised side portion, front rigid raised side portion, and rear rigid raised side portion are rectangular.

29. The apparatus of claim 1 wherein the middle segments of the front base and rear rigid raised side portions comprise a middle segment length that is equal to the middle rigid raised side portion width.

30. A method of stamping a stampable substrate comprising:

a) providing the apparatus of claim 1;

b) providing a stampable substrate;

c) placing an ink stamp on the first or second side of the cover; and d) moving the cover from the left closed position to the right closed position or from the right closed position to the left closed position to stamp the stampable substrate with the ink stamp.

* * * * *